United States Patent

Stevens (10) Patent No.: US 9,209,689 B2
(45) Date of Patent: Dec. 8, 2015

(54) OUTPUT REGULATION WITH NONLINEAR DIGITAL CONTROL LOOP COMPENSATION

(71) Applicant: TerraLUX, Inc., Longmont, CO (US)

(72) Inventor: Arthur Lionel Stevens, Longmont, CO (US)

(73) Assignee: TerraLUX, Inc., Longmont, CO (US)

(*) Notice: Subject to any disclaimer, the term of this patent is extended or adjusted under 35 U.S.C. 154(b) by 132 days.

(21) Appl. No.: 14/083,784

(22) Filed: Nov. 19, 2013

(65) Prior Publication Data

US 2015/0137785 A1    May 21, 2015

(51) Int. Cl.
G05F 1/565 (2006.01)
G05F 1/00 (2006.01)
H02M 3/157 (2006.01)
H02M 1/00 (2007.01)

(52) U.S. Cl.
CPC ...... *H02M 3/157* (2013.01); *H02M 2001/0022* (2013.01)

(58) Field of Classification Search
USPC ................. 323/274, 275, 283–285
See application file for complete search history.

(56) References Cited

U.S. PATENT DOCUMENTS

| | | | |
|---|---|---|---|
| 5,438,505 A | 8/1995 | Cohen | |
| 6,313,616 B1 | 11/2001 | Deller et al. | |
| 6,522,089 B1 | 2/2003 | Duong et al. | |
| 6,911,808 B1* | 6/2005 | Shimamori | 323/283 |
| 7,466,116 B2 | 12/2008 | Sato et al. | |
| 7,609,039 B2 | 10/2009 | Hasegawa | |
| 7,868,603 B2 | 1/2011 | Lacombe et al. | |
| 7,919,952 B1 | 4/2011 | Fahrenbruch | |
| 8,067,928 B2* | 11/2011 | Nakamura et al. | 323/283 |
| 8,232,780 B2* | 7/2012 | Uno | 323/222 |
| 8,288,953 B1 | 10/2012 | Mei | |
| 8,354,827 B2 | 1/2013 | Werle et al. | |
| 8,975,826 B1 | 3/2015 | Stevens | |
| 2005/0280404 A1 | 12/2005 | LeFevre | |
| 2006/0119336 A1 | 6/2006 | King | |
| 2011/0115453 A1 | 5/2011 | Marsili et al. | |
| 2011/0148378 A1* | 6/2011 | Grek | 323/283 |
| 2011/0181260 A1* | 7/2011 | Kurokawa | 323/282 |
| 2011/0316508 A1* | 12/2011 | Cheng et al. | 323/282 |
| 2012/0205974 A1* | 8/2012 | McCaslin et al. | 307/18 |
| 2013/0049723 A1* | 2/2013 | Latham et al. | 323/282 |
| 2013/0084513 A1* | 4/2013 | Quan et al. | 429/431 |
| 2013/0106304 A1* | 5/2013 | Wee et al. | 315/210 |

FOREIGN PATENT DOCUMENTS

| | | |
|---|---|---|
| EP | 0650249 A1 | 4/1995 |
| EP | 2299577 A1 | 3/2011 |

(Continued)

OTHER PUBLICATIONS

PCT International Application No. PCT/US2014/066364, International Search Report and Written Opinion mailed on Mar. 19, 2015, 13 pages.

(Continued)

*Primary Examiner* — Adolf Berhane
*Assistant Examiner* — Gary Nash
(74) *Attorney, Agent, or Firm* — Neugeboren O'Dowd PC (57) ABSTRACT

A digital compensator combines a version of the input voltage with a version of the output current or voltage in such a way as to eliminate dependence on variations in the input voltage.

14 Claims, 6 Drawing Sheets

(56) References Cited

FOREIGN PATENT DOCUMENTS

EP        2323246  A2    5/2011
WO     2004045051  A2    5/2004

OTHER PUBLICATIONS

Bae et al., "Digital State Feedback Control and Feed-Forward Compensation for a Parallel Module DC-DC Converter using the Pole Placement Technique", School of Electrical Engineering and Computer Science, Seoul National University, 2008, pp. 1722-1727.

* cited by examiner

OUTPUT REGULATION WITH NONLINEAR DIGITAL CONTROL LOOP COMPENSATION

TECHNICAL FIELD

Embodiments of the present invention relate generally to voltage and/or current regulation and, more specifically, to regulating voltage and/or current in DC-to-DC converters.

BACKGROUND

An ideal regulator circuit generates a constant output voltage or current for use by a particular circuit or application, despite changes in the load placed on the regulator and/or changes in an input voltage, current, temperature, noise, and other variables. Real-world regulators, however, are not ideal, and changes to some or all of these conditions produce undesirable changes in the output voltage or current.

Figure 1:
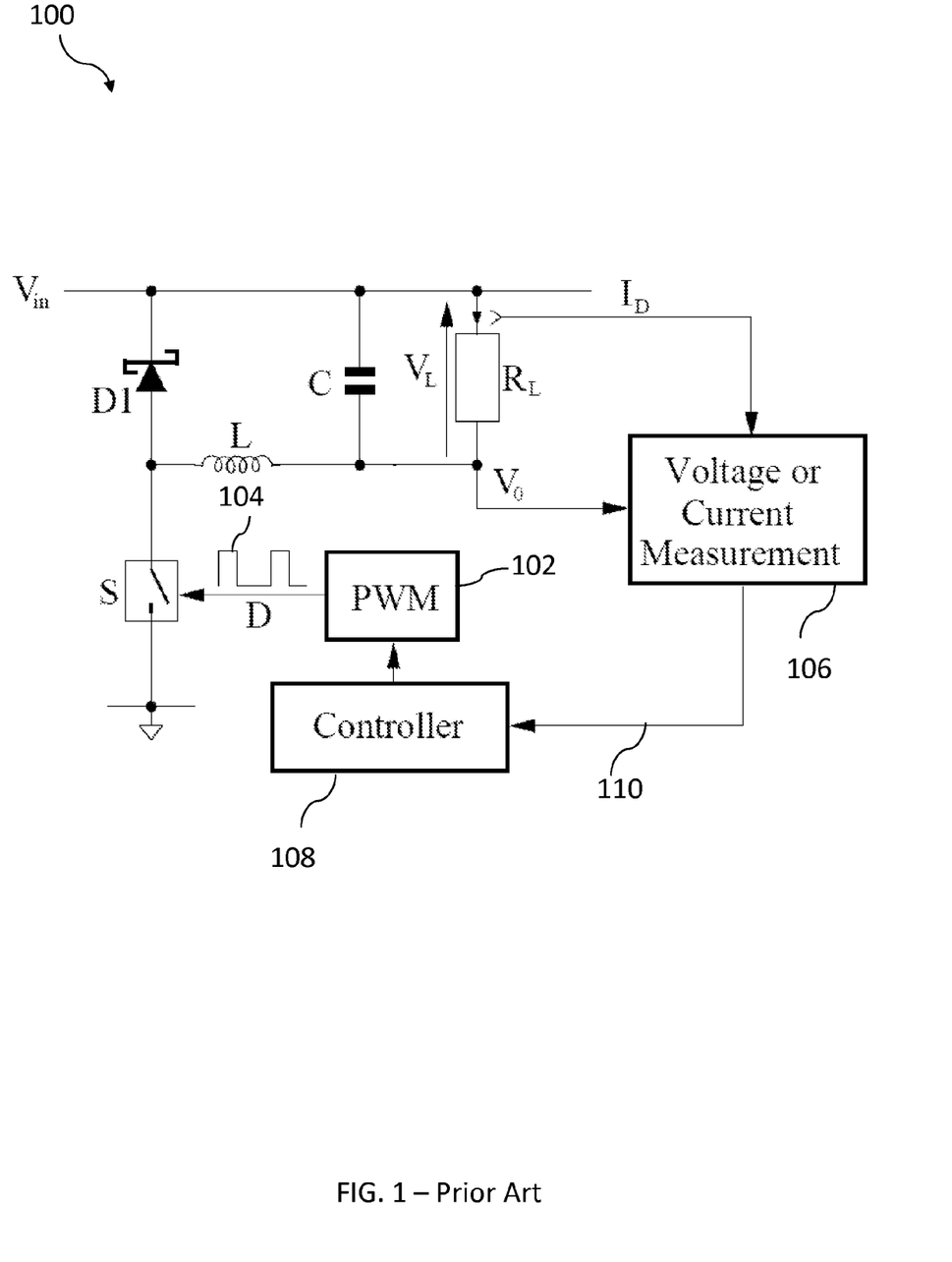
FIG. 1 is a circuit diagram of an exemplary inverted buck circuit.

One type of voltage regulator uses a DC-to-DC converter called an inverted or "floating" buck converter to step down a larger input DC voltage to a smaller output DC voltage. Inverted buck converters may be used, in particular, in applications that do not require a grounded load, such as LED lighting systems. FIG. 1 illustrates a circuit diagram of an exemplary inverted buck regulator 100. An input voltage $V_{in}$ is applied to a terminal of a load $R_L$ and a load current $I_D$ flows through the load $R_L$, thereby developing a load voltage $V_L$. The load current $I_D$ also flows through an inductor L and a switch S. The opening and closing of the switch S is controlled by a pulse-width modulation circuit 102; the duty cycle D of the PWM pulses 104 may be varied to maintain a constant output voltage $V_O$. The output voltage $V_L$ and/or the output current $I_D$ are sampled by a voltage/current measurement circuit 106; a controller 108 receives a sensor signal 110 and adjusts the PWM circuit 102 accordingly.

The inductor L serves to keep the current through the load constant and the capacitor tries to keep the voltage across the load constant. Thus a high-frequency rectangular-shaped PWM waveform with a certain duty cycle D is filtered by a second-order filter (L+C) to extract the DC value for use by the load. Since there are two energy-storage elements (L stores magnetic energy and C stores electrical energy), the system is second-order.

One problem with the circuit 100 of FIG. 1, however, is that it is susceptible to variations in the input voltage; the output current, for example, may undesirably vary if the input voltage varies. Some existing systems measure the inductor current $I_D$ directly, attempt to detect any changes in it, and modify the PWM pulses to reduce the magnitude of the changes. Other systems may measure the inductor current $I_D$ indirectly (by, for example, converting it to a voltage via the use of a small current-sense resistor in series with the load $R_L$). Each of these measurement techniques, however, requires complex, precise, and/or expensive circuitry; the voltage across the current-sense resistor, for example, may be very small and require very precise measurement. Furthermore, existing systems may only reduce, not eliminate, changes in the output current $I_D$ produced by a change in $V_{in}$ (for example), and this reduction may be insufficient to meet the needs of a given consumer of the produced output current. Finally, because existing systems only react to changes in the output current $I_D$ after they occur, the time it takes to detect and correct for these changes may be unacceptable. A need therefore exists for a regulator that produces an output current (or voltage) that is independent of any changes in an input voltage (or current).

SUMMARY

In general, various aspects of the systems and methods described herein reduce, eliminate, or otherwise compensate for variations in a regulated output current or voltage due to undesired variations in an input voltage. The undesired variations may be the result of, for example, variations in rectified AC line voltage. The compensated output current or voltage may be used to drive any electronic circuit, such as LED lights or lamps, digital or computer circuitry, or any other system or circuit. In one embodiment, a digital compensator detects time-varying or periodic variations in the input voltage and, via the use of an iterative-learning control ("ILC") system, a repetitive-control ("RC") system, or a run-to-run control ("R2R") system, generates a compensating signal based on prior behavior of the time variance. In another embodiment, a version of the input voltage is sampled, processed, and combined with a sampled version of the output current or voltage in such a way as to eliminate dependence on the input voltage therefrom.

In a first aspect, a system for regulating an output voltage or current given an input voltage includes an analog-to-digital converter for sampling a signal representing a load current or voltage, a digital controller for (i) detecting a time-varying disturbance in the input voltage and (ii) generating a compensating signal based at least in part thereon, and a modulator for varying the load current or voltage based at least in part on the compensating signal to thereby substantially remove effects of the time-varying disturbance therefrom.

The modulator may be a pulse-width modulator in an inverted floating Buck regulator circuit. The digital controller may include at least one of a repetitive controller, an iterative-learning controller, or run-to-run controller. The digital controller may implement a transfer function for generating the output signal. A current-sense resistor may translate the output current to a voltage. A filter may remove high-frequency components of the signal representing the load current or voltage. An amplifier may amplify the signal representing the load current or voltage. A switch may vary the load current or voltage based on an output of the pulse-width modulator. A source of the time-varying disturbance may include a power transformer or a rectifier. An LED light source may generate light, the output voltage or current being applied thereto.

In another aspect, a system for regulating an output voltage or current includes inverting floating Buck regulator circuitry for controlling the voltage or current through a load, a pulse-width modulator for operating the Buck regulator circuitry, and a digital controller for (i) detecting a time-varying disturbance in the input voltage and (ii) varying a duty cycle of the pulse-width modulator to substantially remove effects of the time-varying disturbance from the output voltage or current.

In another aspect, a method for regulating an output voltage or current given an input voltage includes sampling a signal representing a load current or voltage, detecting a time-varying disturbance in the input voltage, generating a compensating signal based at least in part thereon, and varying the load current or voltage based at least in part on the compensating signal to thereby remove effects of the time-varying disturbance therefrom.

A source of the time-varying disturbance may include a power transformer or a rectifier. The time-varying disturbance may repeat periodically. Generating the compensating signal may include synthesizing an actuation sequence in a current repetition based on a tracking error detected in a prior repetition. Generating the compensating signal may include generating a model of the time-varying disturbance. The compensating signal may vary a duty cycle of a pulse-width modulator that varies the load voltage or current.

In another aspect, a system for regulating an output voltage or current given an input voltage includes a first analog-to-digital converter for sampling a signal representing a load current or voltage, a second analog-to-digital converter for sampling a signal representing an input voltage, a digital controller for (i) generating a signal representing an inverted version of the sampled signal representing the input voltage, (ii) multiplying the signal representing the inverted version of the input voltage with the sampled signal representing the load current or voltage to thereby remove a dependency of the load current or voltage on the input voltage, and (iii) generating a feedback signal based at least in part on the multiplication, the feedback signal being independent to changes in the input voltage, and a pulse-width modulator for varying the load current or voltage based on the feedback signal.

A resistor divider may generate the signal representing an input voltage. The first and second analog-to-digital converters may be time-multiplexed portions of one analog-to-digital converter. The digital controller may include at least one of a repetitive controller, an iterative-learning controller, or run-to-run controller. The digital controller may implement a transfer function for generating the output signal. A current-sense resistor may translate the output current to a voltage. A filter may remove high-frequency components of the signal representing the load current or voltage. The digital controller may further detect when the input voltage is zero and prevents a division-by-zero error.

In another aspect, a method for regulating an output voltage or current given an input voltage includes sampling a signal representing a load current or voltage, sampling a signal representing an input voltage, generating a signal representing an inverted version of the sampled signal representing the input voltage, multiplying the signal representing the inverted version of the input voltage with the sampled signal representing the load current or voltage to thereby remove a dependency of the load current or voltage on the input voltage, generating a feedback signal based at least in part on a result of the multiplication, wherein the feedback signal is independent to changes in the input voltage, and varying the load current or voltage based on the feedback signal.

A source of the time-varying disturbance may include a power transformer or a rectifier. The time-varying disturbance may repeat periodically. The signal representing the input voltage may be generated by scaling the input voltage. Generating the feedback signal may include synthesizing an actuation sequence in a current repetition based on a tracking error detected in a prior repetition. Generating the feedback signal may include generating a model of the time-varying disturbance.

In another aspect, a system for regulating an output voltage or current includes a terminal for receiving an input voltage and control loop circuitry having a loop gain controlling the output voltage or current, the control loop circuitry including a nonlinear element holding the loop gain substantially constant notwithstanding variations in the input voltage.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations. As used herein, the term "substantially" means±10% and, in some embodiments, ±5%.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

In various embodiments of the present invention, a regulator produces an output current $I_D$ that is independent of changes in an input voltage $V_{in}$. In one embodiment, a dynamic compensator circuit (such as a "repetitive control" (RC) circuit or "iterative learning control" (ILC) circuit) analyzes periodic disturbances in the input voltage $V_{in}$ and actively compensates for them. In another embodiment, the input voltage $V_{in}$ is combined with a feedback control signal in such a way to cancel out the effects of any variation in $V_{in}$. For example, a signal that includes an inverted version of $V_{in}$ may be created and multiplied against a PWM feedback signal (which may include a non-inverted version of $V_{in}$), thereby removing the dependence of $V_{in}$ on the PWM feedback signal and removing the dependence of the output current or voltage on $V_{in}$.

Returning to the circuit 100 of FIG. 1, the PWM circuit 102 produces a rectangular-shaped waveform 104 that is passed to the controlled switching device S. The switch S assumes a first state (e.g., either "on" or "off") when the waveform 104 is at a first level (e.g., either "high" or "low") and assumes a second, opposite state when the waveform 104 is at a second level different from (e.g., opposite to) the first level. The configuration of circuit 100 allows the switching device S to be driven with reference to a common ground rail, thereby simplifying the switch drive circuitry. The PWM waveform 104 has a period of T seconds and is at a high value (e.g., 3 V) for $t_{on}$ seconds and at or near zero for $t_{off}$ seconds such that $T=t_{on}+t_{off}$. The duty cycle D is therefore defined as:

$$D = \frac{t_{on}}{T} \qquad (1)$$

which is the amount of time per period T that the waveform 104 is high. Subtracting the duty cycle D from unity gives the amount of time per period T that the waveform 104 is low or zero.

$$(1-D) = \frac{t_{off}}{T} \qquad (2)$$

When the switch S is closed for a duration $t_{on}$, the current through the inductor L increases linearly according to the equation $$\Delta i_L = \frac{V_0 t_{on}}{L} \quad (3)$$

When the switch S is open for a duration $t_{off}$, the stored energy in the inductor L is released through the diode D1, the load resistance $R_L$ and the load capacitance C, according to the equation $$\Delta i_L = \frac{(V_{in} - V_0) t_{off}}{L} \quad (4)$$

Under equilibrium conditions, the changes in inductor current during charging and discharging are equal (a state known as "voltseconds balance"). In other words, if the current in the inductor L increases by a certain amount during $t_{on}$, it decreases by that same amount during $t_{off}$. In this state, the following condition holds:

$$\frac{V_0 t_{on}}{L} = \frac{(V_{in} - V_0) t_{off}}{L} \quad (5)$$

This equation may be re-written as:

$$V_0 t_{on} = (V_{in} - V_0) t_{off} \quad (6)$$

In addition, the output voltage $V_O$ may be expressed in terms of the input voltage $V_{in}$ and the load voltage $V_L$:

$$V_0 = V_{in} - V_L \quad (7)$$

Using equations (1), (6), and (7), the load voltage $V_L$ may be related to the input voltage $V_{in}$:

$$V_L = D V_{in} \quad (8)$$

Equation (8) reveals that the load voltage $V_L$ is directly proportional to the duty cycle D for a given input supply voltage $V_{in}$. As shown in FIG. 1, the controller 108 may be designed to automatically adjust the PWM duty cycle D using measurements of either the output voltage $V_O$ or the load current $I_D$. An example of an application of the topology of the circuit 100 is a simple hysteretic circuit.

In one embodiment of the present invention, the load current $I_D$ through the load $R_L$ is controlled to remain constant. The load current $I_D$ may be expressed as:

$$I_D = \frac{V_L}{R_L} = \frac{D V_{in}}{R_L} \quad (9)$$

Thus, given a constant load resistance $R_L$ and a constant supply voltage $V_{in}$, the load current $I_D$ depends only on the duty cycle, D. If the load resistance $R_L$ varies, however, due to the addition or removal of load elements and/or to changes in the circuit environment, the load current $I_D$ is measured and the duty cycle D is adjusted accordingly to keep the load current $I_D$ constant and at its desired value. In a floating buck controller, the load current $I_D$ flows through the inductor in the controller, so measuring the inductor current $I_L$ is equivalent to measuring the load current $I_D$.

Figure 2:
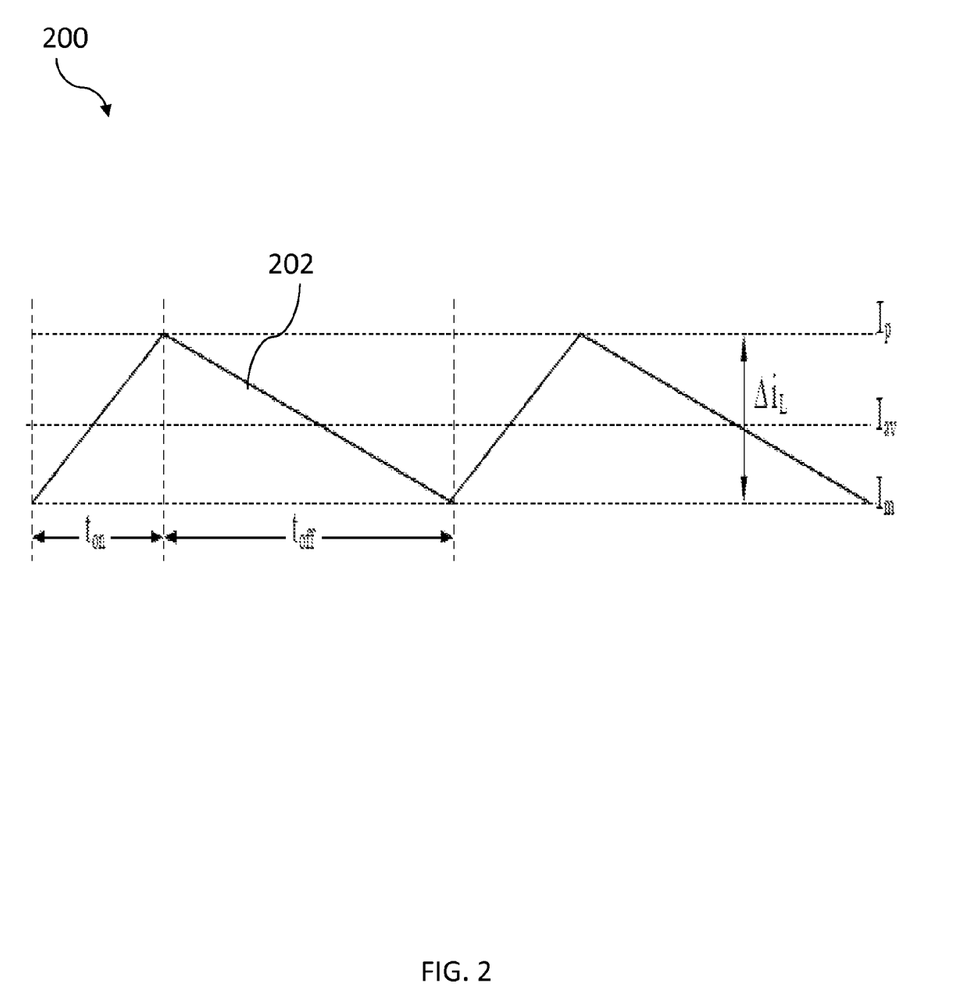
FIG. 2 is a graph of inductor current.

FIG. 2 illustrates a graph 200 of an inductor current $I_L$ waveform 202 in which the inductor current $I_L$ is always nonzero (known as a continuous-conduction mode, or "CCM"). The waveform 202 varies from a minimum value $I_m$ and increases to a maximum value $I_p$ during $t_{on}$ time periods; the waveform 202 decreases during periods of $t_{off}$ back down to the minimum value $I_m$ (for a total change of $\Delta i_L$). The average current $I_L$ is given by:

$$\overline{I_L} = I_m + \frac{\Delta I_L}{2} = \frac{(I_m + I_p)}{2} \quad (10)$$

where $I_m > 0$ during CCM.

Figure 3:
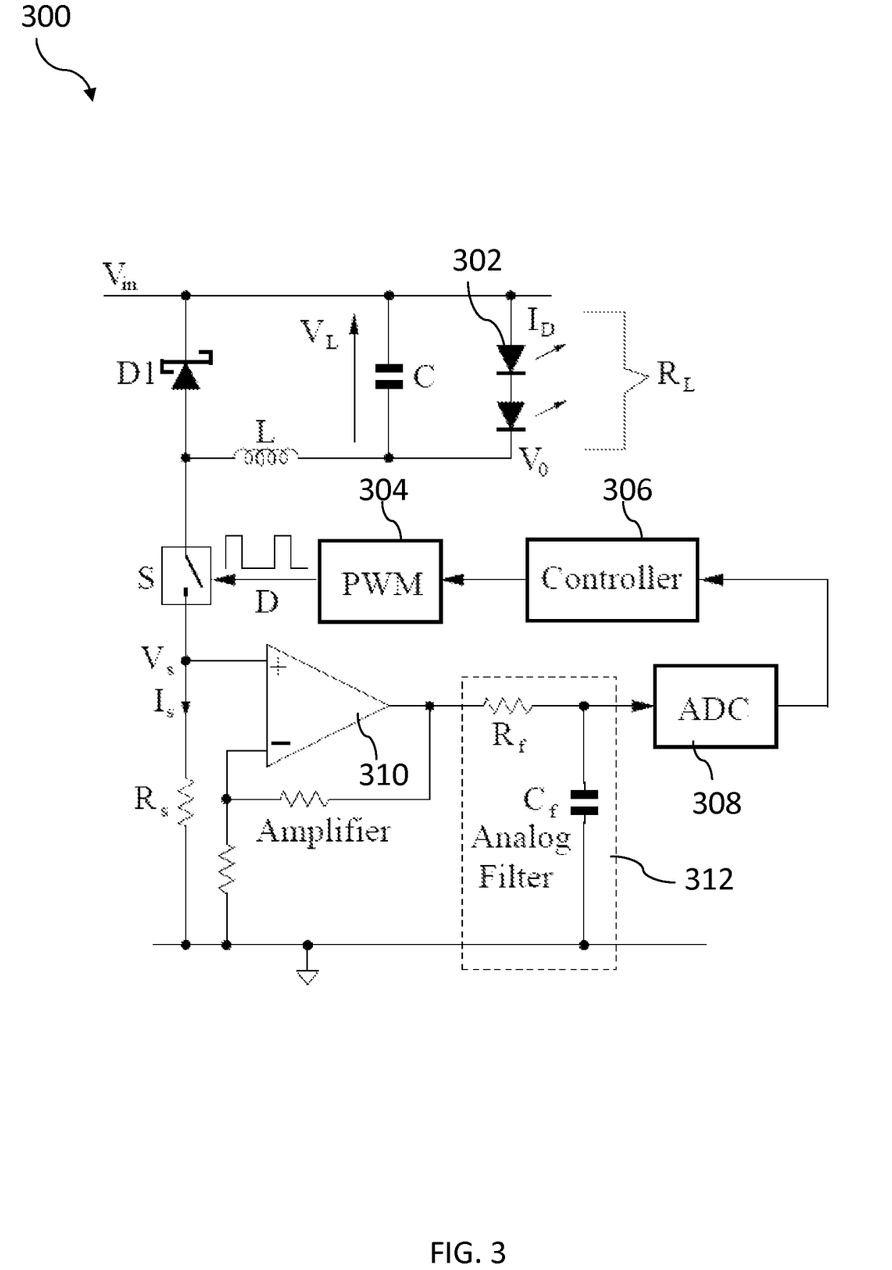
FIG. 3 is a circuit diagram of an inverted buck circuit in accordance with an embodiment of the present invention.

FIG. 3 illustrates a circuit 300 for regulating a current $I_D$ through a load $R_L$. In this embodiment, the load $R_L$ is a string of LEDs 302; the load may be any load, however, such as an electronic circuit, computer system or component, or any other device that requires regulated current or voltage. Input power is received by the circuit 300 from an input source providing a voltage $V_{in}$. An inductor L stores and releases power from the input voltage $V_{in}$, and a diode D1 is used to discharge current through the inductor L. A load capacitor C may be placed in parallel with the load $R_L$. The circuit 300 also includes a switch S controlled by a PWM circuit 304, which in turn is controlled by a controller 306 (which receives input from an analog-to-digital converter (ADC) 308). A resistor $R_S$ converts a current $I_S$ to a voltage $V_S$, which is amplified by an amplifier 310 and filtered with an analog filter 312. The output of the analog filter 312 is digitized by the ADC 308.

In this embodiment, several of the components are implemented in digital logic, while others are or include analog components; the present invention is not limited to any particular implementation (analog, digital or mixed-signal), however, for any component or group of components. Here, the diode D1 may be a zener or other type of diode; the inductor L may be a coil or other type of inductor; the capacitor C may be a ceramic or electrolytic capacitor; and the switch S may be include or more MOSFETs, bipolar-junction transistors, or any other voltage- or current-controlled device capable of switching in response to a received input. The amplifier 310 may be an op amp or similar device; the analog filter 312 may include a resistor $R_f$ and a capacitor $C_f$.

In this embodiment, the PWM circuit 304, controller 306, and ADC 308 are implemented using digital logic. For example, a microprocessor, FPGA, ASIC, microcontroller, or other type of digital circuit may include logic gates and memory elements for implementing these components. Software and/or firmware instructions may be used in conjunction with the digital circuit(s) to implement the components. For example, the PWM circuit 304 may be a dedicated circuit on the microprocessor or it may be a general-purpose circuit that implements the functionality of a PWM system via the use of software and/or firmware instructions.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

In other embodiments, the analog components may be replaced by using digital logic, or vice-versa. For example, the analog filter 312 may be implemented as a digital filter, or the PWM circuit 304 may be an analog circuit. The present invention is not limited to any particular implementation or design choices. It should also be noted that the presence of a control loop can, in some circumstances, permit omission of the capacitor C; the result, however, will be more flicker since the filter order decreases.

Figure 4:
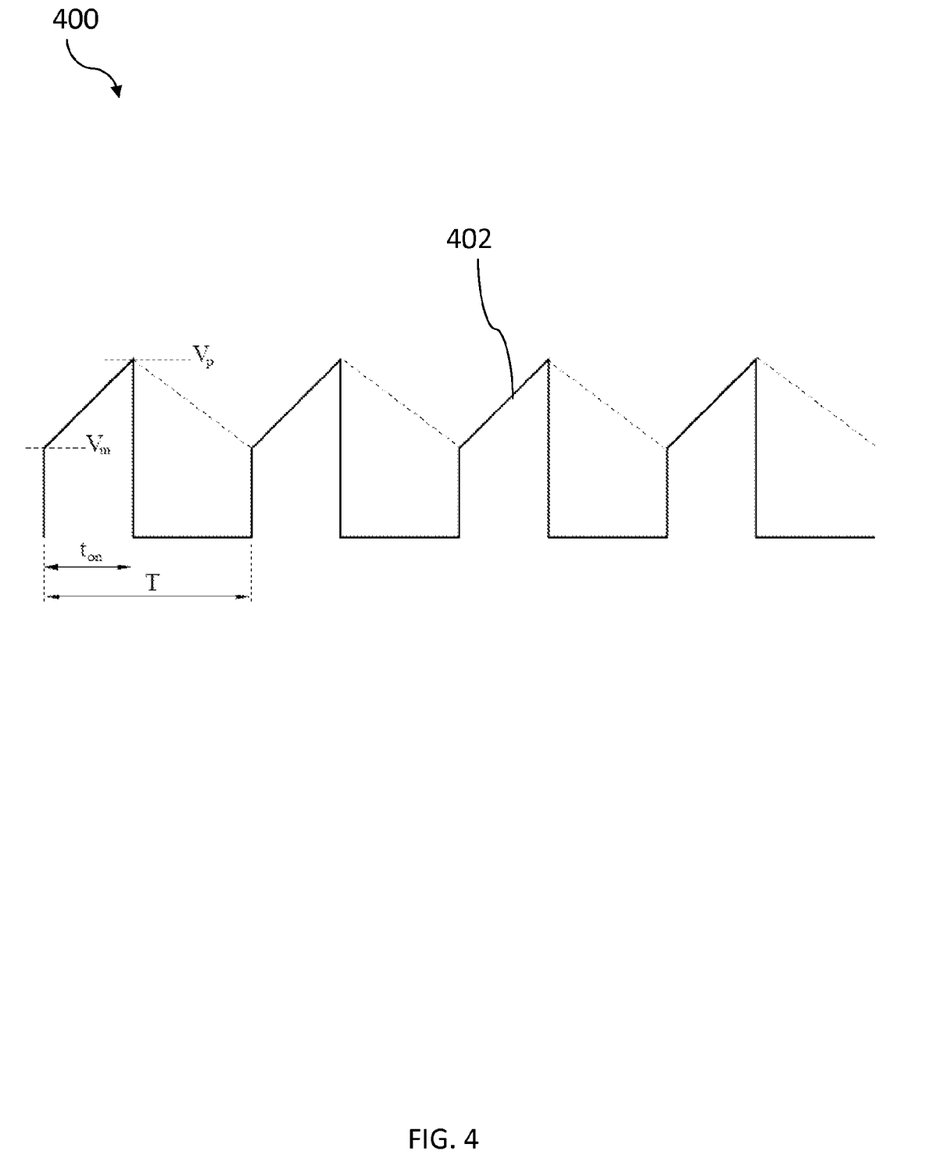
FIG. 4 is a graph of a current-sense voltage waveform in accordance with an embodiment of the present invention.

In the embodiment illustrated in FIG. 3, as mentioned above, a resistor $R_s$ is inserted in series with the switch S. The resistor $R_s$ produces a voltage proportional to the current L flowing in the switch circuit (and hence also through the resistor $R_S$) as shown in FIG. 4. The voltage $V_s$ across the resistor $R_s$ is referenced to ground potential, and thus its average value may be measured more easily than that of the inductor current $I_L$. The average of the current L flowing through the sense resistor, $R_S$, is given by $$\overline{I_s} = \frac{D(I_m + I_p)}{2} \quad (11)$$

which shows a dependence of $I_S$ on the duty cycle D. The voltage across the current sense resistor $R_s$ is:

$$V_S = I_S R_S \quad (12)$$

and the average value of $V_s$ is thus given by:

$$\overline{V_s} = \frac{D(V_m + V_p)}{2} = \frac{DR_s(I_m + I_p)}{2} \quad (13)$$

A graph 400 of a waveform 402 of the average value of the voltage $V_s$ across the sense resistor $R_s$ appears in FIG. 4. From equation (8), the average current in the inductor is:

$$\overline{I_L} = \frac{(I_m + I_p)}{2} \quad (14)$$

Because the load current always flows through the inductor, average $I_D$=average $I_L$, so:

$$\overline{I_D} = \frac{(I_m + I_p)}{2} = \overline{I_L} = I_{av} \quad (15)$$

The average voltage across $V_s$ is:

$$\overline{V_s} = \frac{DR_s(I_m + I_p)}{2} \quad (16)$$

so that:

$$\overline{V_s} = \overline{I_D} DR_s = I_{av} DR_s \quad (17)$$

where $I_{av}$ is the average load current. A measurement of average $V_s$ therefore gives average $I_D$ according to:

$$\overline{I_D} = \frac{\overline{V_s}}{DR_s} = I_{av} \quad (18)$$

Referring to FIGS. 3 and 4, an amplifier 310 amplifies the voltage $V_S$ across the sense resistor $R_S$; the amplified voltage is filtered with an analog filter 312. As explained in greater detail below, the controller 306 may implement a digital-control algorithm for comparing the amplified, filtered, and digitized signal to a reference and generate a control signal for the PWM accordingly.

Figure 5:
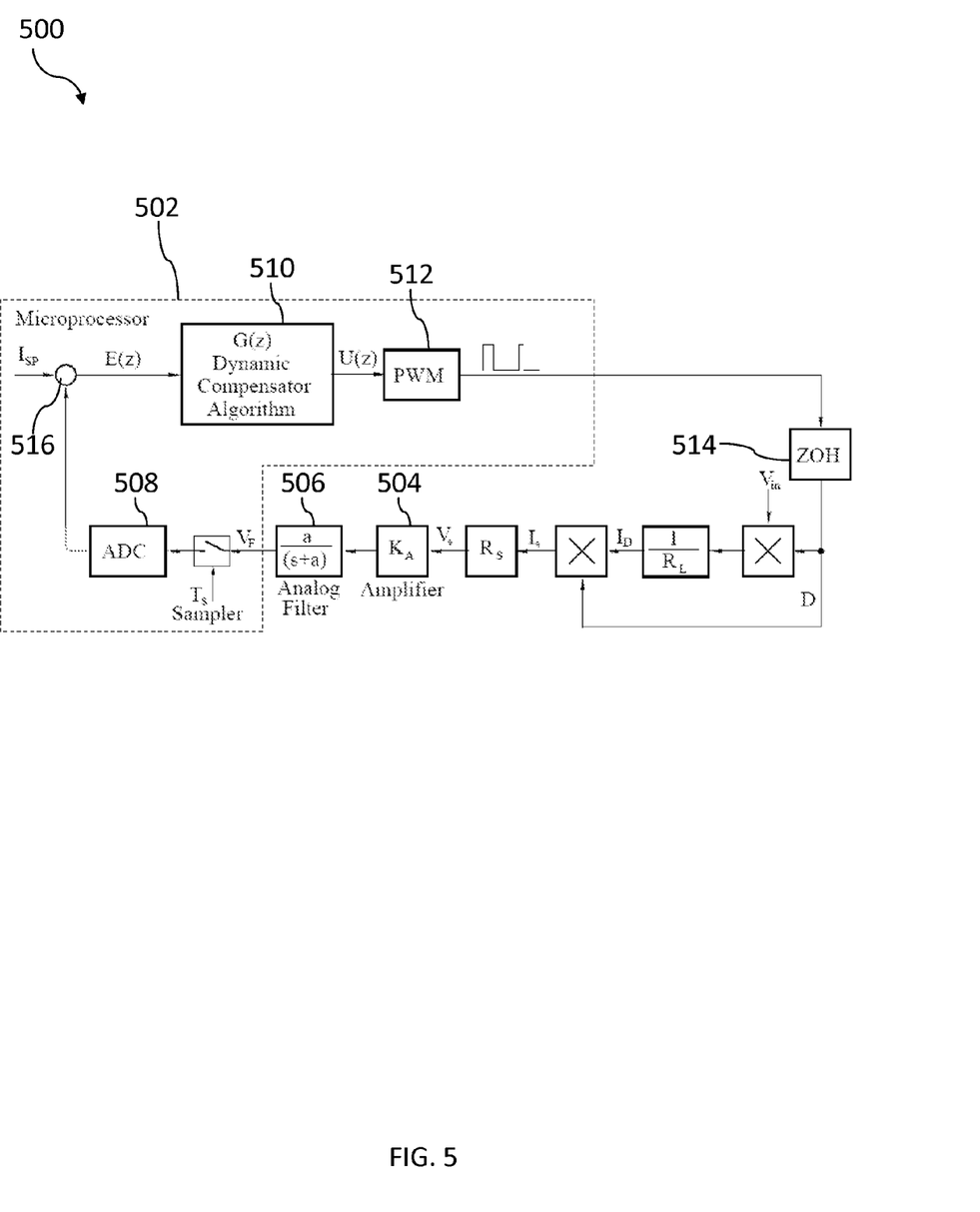
FIG. 5 is a block-diagram model of inverted buck regulator dynamics without a compensated control loop in accordance with an embodiment of the present invention.

FIG. 5 shows a block diagram of a control-loop representation 500 of the regulator 300 shown in FIG. 3. In this embodiment, an amplifier block 504 represents the amplifier 310 of FIG. 3, an analog filter block 506 represents the analog filter 312, and the microprocessor 502 implements the PWM circuit 304, controller 306 (which may correspond to the dynamic compensator 510), and ADC 308.

The voltage $V_s$ across the current-sensing resistor $R_s$ is amplified using an amplifier 504 having a gain $K_A$ and then filtered by a first-order RC analog filter 506 that includes a resistor $R_f$ and a capacitor $C_f$. Any type or order of filter 506 is within the scope of the present invention, however. The filter 506 may have unity DC gain and a cutoff frequency of $\alpha$ radians per second, where:

$$a = \frac{1}{R_f C_f} \quad (19)$$

The filter 506 filters out any high-frequency component(s) of the switching frequency to provide a smoothed and scaled version of the average value of current $I_s$. The filter 506 also acts as an anti-aliasing filter for the digital control loop, explained in greater detail below. An ADC 508 converts the amplified and smoothed signal from $V_s$ into a binary voltage for use by the digital control algorithm implemented in (e.g.) firmware inside the microprocessor 502. In other embodiments, as described above, the digital-control algorithm components implemented using the microprocessor 502 are implemented using analog circuitry, in which case, no ADC would be required.

The values of $R_s$, $R_L$, and $K_A$ are known because they may be determined from the properties of the chosen devices, as is the duty cycle D, because it is a parameter determined by the controller 306. The ADC 308 takes samples of the filtered voltage at uniform time intervals of $T_s$ seconds and converts the filtered voltage to a sequence of binary values. The values from the ADC are subtracted (using a subtractor/comparator 516) from a setpoint value $I_{SP}$, which represents the desired load current, to form an error signal E(z). A discrete-time controller algorithm block 510 implements a z-domain transfer function G(z) and processes the error signal E(z) to produce an actuation signal U(z), which is fed to the PWM module 512. The PWM module 512 produces a rectangular-shaped signal (or any other type or shape of signal suitable for controlling the switch S), as discussed above. A zero-order-hold ("ZOH") block 514 is associated with the ADC and is included in the model 500 to represent the discrete-time updating of the value of D (in accordance with a sampling frequency $T_s$) and does not necessarily correspond to a real-world component in FIG. 3.

The analog filter 506 produces an output proportional to the average of its input; the filtered voltage $V_F$ at the input to the ADC 506 is thus given by:

$$V_F = D I_{av} R_S K_A \quad (20)$$

The gain-bandwidth product of the amplifier 504 must be sufficiently high so that its frequency response is flat over the range of the bandwidth of the control loop illustrated in FIG. 5.

The transfer function from the duty cycle signal D to the input voltage $V_F$ at the ADC 506 is given by:

$$V_F(s) = \frac{K_A R_s D^2 a V_{in}(s)}{R_L(s+a)} = \left[\frac{a K_A R_s D^2}{(s+a) R_L}\right] V_{in}(s) \quad (21)$$

where the variable s is the Laplace transform operator in the s-domain.

The cutoff frequency of the analog filter may be lower in frequency than the sampling rate of the controller but higher than that of the rate of fluctuation of $V_{in}$ (which may occur at 120 Hz for a full-wave rectified 60 Hz mains input voltage $V_{in}$). For example, the filter 506 may have a cutoff frequency of 1200 Hz with an ADC sampling rate of 10 kHz. With these or similar design parameters of the filter 506, $V_F$ may be approximately constant between the sampling instants. Therefore, the low-frequency gain of the transfer function in Equation (21) is also approximately constant and is given by:

$$K = \frac{K_A R_s D^2}{R_L} \quad (22)$$

which, when applied to Equation (21), yields:

$$V_F(s) = \frac{Ka}{(s+a)} V_{in} \quad (23)$$

The feedback path gain, H, at low frequencies varies directly with respect to $V_{in}$:

$$H = K V_{in} \quad (24)$$

In various systems, as discussed above, $V_{in}$, includes a time-varying component that negatively impacts the feedback-path gain by causing it to vary as well. For example, the input voltage $V_{in}$, may be generated using a full-wave rectifier that is powered using a 60 Hz alternating-current (AC) voltage source supplied by, for example, a power transformer. The full-wave rectified signal may be filtered by smoothing capacitors to produce a DC pulsating voltage waveform having an amplitude that undulates at a frequency of 120 Hz. Hence the changing value of the voltage $V_{in}$ acts to modulate the loop gain, which adversely affects the regulation performance over each half cycle of the 60 Hz mains voltage. At high values of $V_{in}$, for example, the loop gain will be high, providing high-accuracy current regulation. As $V_{in}$ drops, however, the regulation performance degrades, perhaps to an unacceptable level. For a 12 V AC power supply, for example, $V_{in}$ could vary from 17 V at the peak of the rectified waveform to a value at or near zero volts, depending on (for example) the size of a supply-rail smoothing capacitor.

Because the loop gain modulated by $V_{in}$ represents a periodic disturbance in the rectified AC input voltage case, as described above, this periodic disturbance may be reduced or eliminated by the compensator 510 producing a counteracting modulation signal based on the desired current $I_{SP}$ to change the load current $I_D$ in such a way that the unwanted periodic disturbance is cancelled. For example, the compensator 510 may implement an iterative-learning control ("ILC") system, a repetitive-control ("RC") system, or a run-to-run control ("R2R") system.

In general, ILC and RC controllers are adaptive controllers that adjust a control action, u, for a repetition j, by synthesizing a suitable actuation sequence based on a tracking error measured in a prior repetition (j−1). Unlike ordinary adaptive controllers, which adjust controller parameters such as gain and polynomial coefficients, ILC and RC controllers modify the actuation signal of the control system directly. ILC and RC controllers may compensate for the effects of disturbances if they are the same for every repetition, because the system learns from previous iterations and injects correction signals via feed-forward. By contrast, a non-learning controller produces the same tracking error on each pass of the repetition because no such changes are made. ILC/RC systems do not require that the reference or disturbance signals be known or measurable, only that these signals remain unchanged from iteration to iteration. ILC systems may be most appropriate for batch processes (in which a procedure is performed and then stops after which it is repeated again at a later time); RC systems may be most appropriate for continuous processes (in which a procedure is performed repeatedly over and over again without any pause between the iterations). For a batch process, the initial conditions are set to the same value at the start of each step; in a continuous process, the final conditions of the previous repetition become the initial conditions for the present repetition. Control theories, including RC and ILC methodologies, are well understood and described in, for example, "The Internal Model Principle of Control Theory" by Francis B. A. and Wonham W. M., (Automatica, vol. 12, pp 457-465, 1976); "Survey of iterative learning control, repetitive control and run-to-run control" by Wang Y., Gao F., and Doyle F. J., (Journal of Process Control, vol 19, pp 1598-1600, 2009); "Iterative learning control and repetitive control for engineering practice" by Longman R. W., (International Journal of Control, vol. 73, no. 10, pp 930-954, 2000); and "A Survey of Iterative Learning Control" by Bristow D. A., Tharayil M. and, Alleyne A. G., (IEEE Control Systems Magazine, pp 96-114, June 2006), which are hereby incorporated by reference in their entireties.

In general, a discrete-time control system may be described by the state space formulation given below in Equations (25) and (26):

$$x(k) = Ax(k-1) + Bu(k-1) + w(k-1) \quad (25)$$

$$y(k) = Cx(k) \quad (26)$$

where x(k) is the state vector, u(k) is the input vector, y(k) is the output vector, w(k) is a disturbance sequence, and k is the discrete-time sample number (1, . . . , n). A repetition may be represented using a collection of vectors, each having a total of n samples. The vectors may be of finite-time duration, in contrast to the more usual infinite duration vectors in ordinary control system analysis. The disturbance w(k) describes any repeating deterministic disturbance sequence. Such a disturbance is not confined to signals such as sinusoids; it may be a time-indexed sequence of any arbitrary shape, provided that it is identical (or approximately so) for every repetition.

An ILC system may account for an error via the use of a "learning matrix." A typical ILC learning law is of the form $$u(j+1,k) = u(j,k) + Le(j,k) \quad (27)$$

where L is the learning gain matrix. Equation (5) shows that the actuation sequence for the iteration (j+1) is the same as that for the previous iteration, j, but with a correction factor added that depends on the error sequence of the $j^{th}$ iteration. The vectors u(j, k) and e(j, k) are each filled with n samples (for k=1 to n) of the actuation and error sequences, respectively, for repetition number j. The ILC control algorithm then calculates the actual control input actuation sequence u(j+1, k) for repetition (j+1) for all the k values up to n.

The control law of equation (27) may be represented for a plant described by $$y(j,k)=P(q)u(j,k)+d(k) \tag{28}$$

where P(q) is the discrete-time plant transfer function, P(z), in the corresponding time domain difference equation notation, with q being the forward shift operator such that qu(k)=u(k+1). The sequence d(k) is the repetitive disturbance entering the system.

If the learning matrix is chosen correctly and the system is asymptotically stable, the error signal decays to zero with time. In this situation, the shape of the actuation sequence (or signal), u, will be such that the repetitive disturbance occurring each iteration will be cancelled during each pass. The behavior of the error from one repetition to the next, follows the equation $$e(j,k)=(I-PL)e(j-1,k) \tag{29}$$

which may be expanded out from the initial iteration e(0, k) as $$e(j,k)=(I-PL)^j e(0,k) \tag{30}$$

To ensure that asymptotic convergence to zero of the error occurs, it is generally necessary to ensure that all the eigenvalues of the matrix (I−PL) are less than unity, i.e.

$$\|\lambda_i(I-PL)\|<1 \forall i \tag{31}$$

The simplest practical ILC control law is a proportional type where L is simply a gain. A non-causal control law of the form $$u(j+1,k)=u(j,k)+Le(j,k+1) \tag{32}$$

is implementable in practice because, when calculating u(j+1, k) for iteration (j+1), the entire data set of sequences for u(j, k) and e(j, k) are available, because they are stored in memory, so we have access to the error at sample time (k+1). The error at time step k for iteration j is given by $$e(j,k)=y_d(k)-P(q)u(j,k)-d(k) \tag{33}$$

and therefore $$e(j,k+1)=y_d(k+1)-P(q)u(j,k+1)-d(k+1) \tag{34}$$

so e(j, k+1), which is available when u(j+1, k) is calculated, may be regarded as a prediction or anticipation of the disturbance at time step (k+1), that is, it anticipates the disturbance d(k+1). A more general learning control law is given by $$u(j+1,k)=Q(q)[u(j,k)+L(q)e(j,k+1)] \tag{35}$$

In this case, we have a dynamic learning gain matrix L(q) and an additional filter Q(q) to help with asymptotic stability. For this system, convergence and asymptotic stability is achieved only if $$\|\lambda_i(Q(1-LP))k\|<1 \forall i \tag{36}$$

RC systems may be applicable to situations in which continuous repetitive processes occur, such as a continuous, uniform disturbance in an input voltage $V_{in}$. RC systems may deal with the frequency domain and be based on the use of the Internal Model Principle, which roughly states that, to completely reject a disturbance or perfectly track an input trajectory, the control loop must contain a model of the disturbance or input signal. Consider the following simple discrete-time transfer function:

$$H(z) = \frac{1}{z^T - 1} \tag{37}$$

A sampled signal sequence of length N samples for a duration of T seconds can be made to repeat with period T seconds by passing it through a filter H(z). Using the Internal Model Principle, if the disturbance is a pure sinusoid, a model of this sinusoid is included in the control system. Such a system is a special case of the repetitive generator of Equation (37). Other design techniques can also be used to design the control system using many "modern control" theory methods, as one of skill in the art will understand; these other control theories are all within the scope of the present invention. The parameters of L(q) and Q(q) may be designed to ensure overall system stability and convergence of the tracking error for repetitive disturbances.

The present invention is not limited to any particular type of compensator 510 or any particular number or arrangement of components therein; one of skill in the art will understand that the functionality of the compensator 510 may be implemented in a variety of ways (e.g., as an RC system, an ILC system, and/or a combination RC/ILC system selectable by the compensator or a higher-level control system based on analysis of the disturbance pattern).

Figure 6:
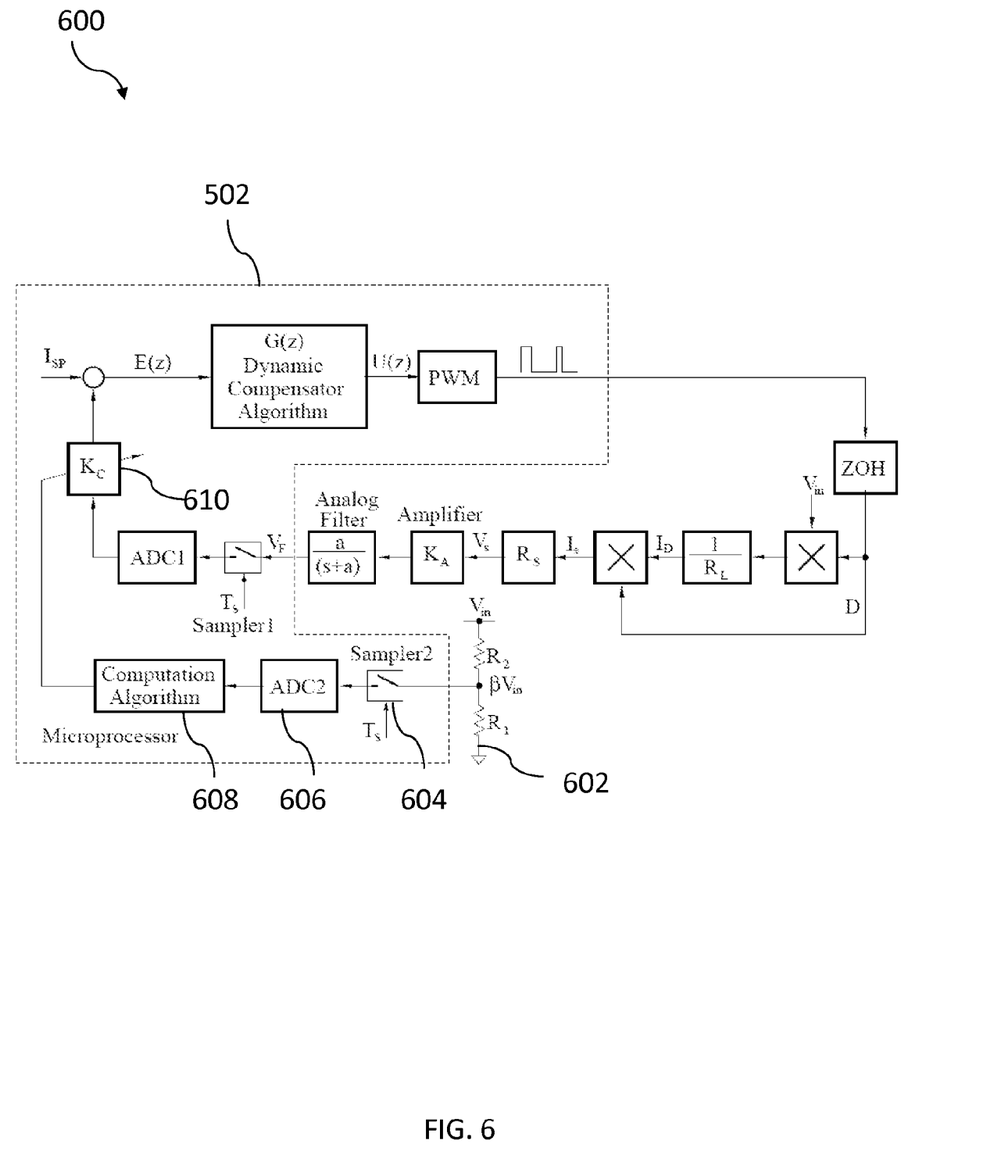
FIG. 6 is a block-diagram model of inverted buck regulator dynamics with a compensated control loop in accordance with an embodiment of the present invention.

In another embodiment of the present invention, the influence of $V_{in}$ is removed from the control loop and hence the output current $I_D$. FIG. 6 illustrates a system 600 in which the microprocessor 502 of FIG. 5 is modified to measure a value of $V_{in}$ and compensate for its influence. A resistive potential divider 602, including resistors $R_1$ and $R_2$, is connected between $V_{in}$ and ground and is used to obtain a scaled version of the $V_{in}$ value. The scale factor β is given by $$\beta = \frac{R_1}{R_1 + R_2} \tag{38}$$

In other embodiments, $V_{in}$ is scaled by other means (an active-device circuit, for example) or is unscaled.

The scaled voltage $\beta V_{in}$ may be sampled by an additional sampler 604 and ADC 606. The second sampler 604 and ADC 606 may run at the same sampling rate $T_s$ as the first ADC 508 and thereby provide output values sequentially within each sampling period. Alternatively, because the sampling rate for use with the first ADC 508 may be chosen to be much higher than 120 Hz, a different, slower sampling rate may be used with the second ADC 606 for gathering the slower-changing $V_{in}$ values. This slower sampling rate may be, for example, 500 Hz. In another embodiment, the first ADC 508 is modified to include multiple channels that may be multiplexed to sample and convert two values in an interleaved or time-multiplexed fashion (at the same or different sampling rates) and thus combine the functionality of both the first 508 and second 606 ADCs.

The sampled values produced by the second sampler 604 and the second ADC 606 are passed to a computation block 608 that computes a value $K_C$ that corresponds to a reciprocal value of $V_{in}$, thereby introducing a nonlinear cancellation gain in the overall loop gain expression. In one embodiment, $K_C=1/V_{in}$; in other embodiments, $K_C$ is proportional to $1/V_{in}$. A multiplier 610 multiplies the value output from the first ADC 508 with the compensation gain $K_C$ to thereby produce a signal that no longer has a component of $V_{in}$ (i.e., a signal that does not depend on $V_{in}$). The output of the multiplier 610 is then subtracted from the current setpoint $I_{SP}$ with the subtracter 516. Thus, the transfer functions between $V_F$ and V3 and hence between the PWM output and V3 will be constant and independent of Vin.

The computation block 608 may include a digital multiplier, divider, accumulator, adder/subtracter, or any other type of computational circuitry. Referring again to FIG. 3, the computation block may be implemented using the controller 306 or with a second controller. As stated above with reference to the controller 306, the computation block may be implemented using any combination of analog or digital circuitry, software, and/or firmware.

In one embodiment, to prevent a division by zero occurring in the event that $V_{in}$ reaches zero, the algorithm in the computation block 608 includes a test for this condition (e.g., an if-then statement in firmware code) and, if it is encountered, sets the value of the gain to a predetermined maximum allowable value.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A system for regulating an output voltage or current given an input voltage, the system comprising:
   a first analog-to-digital converter for sampling a signal representing a load current or voltage;
   a second analog-to-digital converter for sampling a signal representing an input voltage;
   a digital controller for:
      i. generating a signal representing an inverted version of the sampled signal representing the input voltage;
      ii. multiplying the signal representing the inverted version of the input voltage with the sampled signal representing the load current or voltage to thereby remove a dependency of the load current or voltage on the input voltage; and
      iii. generating a feedback signal based at least in part on the multiplication, the feedback signal being independent to changes in the input voltage; and
   a pulse-width modulator for varying the load current or voltage based on the feedback signal.

2. The system of claim 1, further comprising a resistor divider for generating the signal representing an input voltage.

3. The system of claim 1, wherein the first and second analog-to-digital converters are time-multiplexed portions of one analog-to-digital converter.

4. The system of claim 1, wherein the digital controller comprises at least one of a repetitive controller, an iterative-learning controller, or run-to-run controller.

5. The system of claim 1, wherein the digital controller implements a transfer function for generating the output signal.

6. The system of claim 1, further comprising a current-sense resistor for translating the output current to a voltage.

7. The system of claim 1, further comprising a filter for removing high-frequency components of the signal representing the load current or voltage.

8. The system of claim 1, wherein the digital controller further detects when the input voltage is zero and prevents a division-by-zero error.

9. A method for regulating an output voltage or current given an input voltage, the method comprising:
   sampling a signal representing a load current or voltage;
   sampling a signal representing an input voltage;
   generating a signal representing an inverted version of the sampled signal representing the input voltage;
   multiplying the signal representing the inverted version of the input voltage with the sampled signal representing the load current or voltage to thereby remove a dependency of the load current or voltage on the input voltage;
   generating a feedback signal based at least in part on a result of the multiplication, wherein the feedback signal is independent to changes in the input voltage; and
   varying the load current or voltage based on the feedback signal.

10. The method of claim 9, wherein a source of the time-varying disturbance comprises a power transformer or a rectifier.

11. The method of claim 9, wherein the time-varying disturbance repeats periodically.

12. The method of claim 9, further comprising generating the signal representing the input voltage by scaling the input voltage.

13. The method of claim 9, wherein generating the feedback signal comprises synthesizing an actuation sequence in a current repetition based on a tracking error detected in a prior repetition.

14. The method of claim 9, wherein generating the feedback signal comprises generating a model of the time-varying disturbance.

* * * * *